United States Patent
Deniau et al.

(10) Patent No.: US 9,676,238 B2
(45) Date of Patent: Jun. 13, 2017

(54) TIRE PRESSURE MONITOR SYSTEM APPARATUS AND METHOD

(71) Applicant: Continental Automotive Systems, Inc., Auburn Hills, MI (US)

(72) Inventors: Jean-Christophe Deniau, Fenton, MI (US); Themi Anagnos, LaGrange Park, IL (US); Brian J. Farrell, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/934,787

(22) Filed: Nov. 6, 2015

(65) Prior Publication Data
US 2016/0059647 A1    Mar. 3, 2016

(51) Int. Cl.
*B60C 23/00* (2006.01)
*B60C 23/04* (2006.01)
*H04L 27/00* (2006.01)

(52) U.S. Cl.
CPC ...... *B60C 23/0445* (2013.01); *B60C 23/0461* (2013.01); *B60C 23/0462* (2013.01); *B60C 23/0471* (2013.01); *B60C 23/0479* (2013.01); *H04L 27/0008* (2013.01)

(58) Field of Classification Search
CPC .................... B60C 23/0445; B60C 23/0479
USPC ............. 340/447, 442, 445, 448, 449, 13.24
See application file for complete search history.

(56) References Cited

U.S. PATENT DOCUMENTS

| | | | |
|---|---|---|---|
| 2,428,089 A | 9/1947 | Mumma et al. |
| 2,451,859 A | 10/1948 | Mumma et al. |
| 3,777,062 A | 12/1973 | Ogawa |
| 3,814,839 A | 6/1974 | Lubarsky et al. |
| 3,814,840 A | 6/1974 | Lubarsky et al. |
| 4,589,063 A | 5/1986 | Shah et al. |
| 4,703,359 A | 10/1987 | Rumbolt |
| 4,734,674 A | 3/1988 | Thomas et al. |
| 4,737,761 A | 4/1988 | Dosjoub et al. |
| 4,742,857 A | 5/1988 | Gandhi |
| 4,774,511 A | 9/1988 | Rumbolt et al. |

(Continued)

FOREIGN PATENT DOCUMENTS

| | | |
|---|---|---|
| DE | 4492128 | 6/1996 |
| DE | 19503756 | 8/1996 |

(Continued)

OTHER PUBLICATIONS

"Sony Remote Commander Operating Instructions RM-V701/V801", 1998, Sony Corporation.

(Continued)

*Primary Examiner* — Tai Nguyen

(57) ABSTRACT

A first signal transmission is received from a transmitter external to the monitor, the first signal having a transmission characteristic. Based upon the transmission characteristic of the first signal transmission and not any data in the first transmission, a corresponding at least one protocol is determined. A data resolution based upon the transmission characteristic is determined. A second data transmission is formed according to the corresponding at least one protocol, and the sensed data is inserted into the second data transmission according to the resolution. The second data transmission is transmitted.

3 Claims, 9 Drawing Sheets

(56) References Cited

U.S. PATENT DOCUMENTS

| | | |
|---|---|---|
| 4,924,210 A | 5/1990 | Matsui et al. |
| 4,959,810 A | 9/1990 | Darbee |
| 4,999,622 A | 3/1991 | Amano et al. |
| 5,061,917 A | 10/1991 | Higgs et al. |
| 5,196,682 A | 3/1993 | Englehardt |
| 5,201,067 A | 4/1993 | Grube |
| 5,223,844 A | 6/1993 | Mansel |
| 5,228,077 A | 7/1993 | Darbee |
| 5,231,872 A | 8/1993 | Bowler et al. |
| 5,243,430 A | 9/1993 | Emmons |
| 5,255,313 A | 10/1993 | Darbee |
| 5,303,259 A | 4/1994 | Loveall |
| 5,335,540 A | 8/1994 | Bowler et al. |
| 5,365,225 A | 11/1994 | Bachhuber |
| 5,414,761 A | 5/1995 | Darbee |
| 5,434,572 A | 7/1995 | Smith |
| 5,455,570 A | 10/1995 | Cook |
| 5,515,052 A | 5/1996 | Darbee |
| 5,537,463 A | 7/1996 | Escobosa |
| 5,540,092 A | 7/1996 | Handfield et al. |
| 5,552,917 A | 9/1996 | Darbee |
| 5,562,787 A | 10/1996 | Koch et al. |
| 5,564,101 A | 10/1996 | Eisfeld et al. |
| 5,581,023 A | 12/1996 | Handfield et al. |
| 5,585,554 A | 12/1996 | Handfield et al. |
| 5,600,301 A | 2/1997 | Robinson, III |
| 5,602,524 A | 2/1997 | Mock et al. |
| 5,614,906 A | 3/1997 | Hayes |
| 5,624,265 A | 4/1997 | Redford |
| 5,661,651 A | 8/1997 | Geschke et al. |
| 5,663,496 A | 9/1997 | Handfield et al. |
| 5,698,353 A | 12/1997 | Jeong |
| 5,706,247 A | 1/1998 | Merritt et al. |
| 5,731,516 A | 3/1998 | Handfield et al. |
| 5,731,763 A | 3/1998 | Herweck |
| 5,732,283 A | 3/1998 | Rose et al. |
| 5,741,966 A | 4/1998 | Handfield et al. |
| 5,768,499 A | 6/1998 | Treadway et al. |
| 5,808,558 A | 9/1998 | Meek et al. |
| 5,838,229 A | 11/1998 | Robinson, III |
| 5,841,390 A | 11/1998 | Tsui |
| 5,844,131 A | 12/1998 | Gabelmann et al. |
| 5,880,363 A | 3/1999 | Meyer et al. |
| 5,883,305 A | 3/1999 | Jo et al. |
| 5,900,808 A | 5/1999 | Lebo |
| 5,926,087 A | 7/1999 | Busch et al. |
| 5,959,751 A | 9/1999 | Darbee |
| 5,963,128 A | 10/1999 | McClelland |
| 5,965,808 A | 10/1999 | Normann et al. |
| 6,002,450 A | 12/1999 | Darbee |
| 6,005,486 A | 12/1999 | Fridley |
| 6,011,463 A | 1/2000 | Cormier, Sr. |
| 6,014,092 A | 1/2000 | Darbee |
| 6,018,993 A | 2/2000 | Normann et al. |
| 6,021,319 A | 2/2000 | Tigwell |
| 6,034,597 A | 3/2000 | Normann et al. |
| 6,078,270 A | 6/2000 | Shim |
| 6,087,930 A | 7/2000 | Kulka et al. |
| 6,112,165 A | 8/2000 | Uhl et al. |
| 6,124,786 A | 9/2000 | Normann et al. |
| 6,141,792 A | 10/2000 | Acker et al. |
| 6,154,658 A | 11/2000 | Casi |
| 6,155,119 A | 12/2000 | Normann et al. |
| 6,169,480 B1 | 1/2001 | Uhl et al. |
| 6,169,907 B1 | 1/2001 | Chang et al. |
| 6,181,241 B1 | 1/2001 | Normann et al. |
| 6,192,747 B1 | 2/2001 | Fennel |
| 6,194,999 B1 | 2/2001 | Uhl et al. |
| 6,201,819 B1 | 3/2001 | Luders |
| 6,204,758 B1 | 3/2001 | Wacker et al. |
| 6,208,341 B1 | 3/2001 | van Ee et al. |
| 6,218,936 B1 | 4/2001 | Imao |
| 6,259,361 B1 | 7/2001 | Robillard et al. |
| 6,271,748 B1 | 8/2001 | Derbyshire et al. |
| 6,275,148 B1 | 8/2001 | Takamura et al. |
| 6,297,731 B1 | 10/2001 | Flick |
| 6,298,095 B1 | 10/2001 | Kronestedt et al. |
| 6,333,698 B1 | 12/2001 | Roddy |
| 6,362,731 B1 | 3/2002 | Lill |
| 6,369,703 B1 | 4/2002 | Lill |
| 6,396,408 B2 | 5/2002 | Drummond et al. |
| 6,400,263 B1 | 6/2002 | Kokubo |
| 6,408,232 B1 | 6/2002 | Cannon et al. |
| 6,438,467 B1 | 8/2002 | Pacsai |
| 6,441,728 B1 | 8/2002 | Dixit et al. |
| 6,445,286 B1 | 9/2002 | Kessler et al. |
| 6,446,502 B1 | 9/2002 | Normann et al. |
| 6,453,737 B2 | 9/2002 | Young et al. |
| 6,463,798 B2 | 10/2002 | Niekirk et al. |
| 6,469,621 B1 | 10/2002 | Vredevogd et al. |
| 6,477,165 B1 | 11/2002 | Kosco |
| 6,486,773 B1 | 11/2002 | Bailie et al. |
| 6,489,888 B1 | 12/2002 | Honeck et al. |
| 6,490,452 B1 | 12/2002 | Boscovic et al. |
| 6,507,306 B1 | 1/2003 | Griesau |
| 6,518,891 B2 | 2/2003 | Tsutsui et al. |
| 6,567,032 B1 | 5/2003 | Mullaly |
| 6,571,617 B2 | 6/2003 | Van Niekerk et al. |
| 6,612,165 B2 | 9/2003 | Juzswik et al. |
| 6,622,552 B1 | 9/2003 | Delaporte |
| 6,630,885 B2 | 10/2003 | Hardman et al. |
| 6,633,229 B1 | 10/2003 | Normann et al. |
| 6,662,642 B2 | 12/2003 | Breed et al. |
| 6,667,687 B1 | 12/2003 | DeZori |
| 6,681,164 B2 | 1/2004 | Berghoff et al. |
| 6,693,522 B2 | 2/2004 | Tang et al. |
| 6,704,364 B1 | 3/2004 | Lim et al. |
| 6,705,155 B2 | 3/2004 | Katou |
| 6,710,708 B2 | 3/2004 | McClelland et al. |
| 6,731,205 B2 | 5/2004 | Schofield et al. |
| 6,737,965 B2 | 5/2004 | Okubo |
| 6,738,697 B2 | 5/2004 | Breed |
| 6,747,590 B1 | 6/2004 | Weber |
| 6,750,761 B1 | 6/2004 | Newman |
| 6,774,778 B2 | 8/2004 | Lin |
| 6,778,380 B2 | 8/2004 | Murray |
| 6,788,193 B2 | 9/2004 | King et al. |
| 6,794,993 B1 | 9/2004 | Kessler et al. |
| 6,801,872 B2 | 10/2004 | Normann et al. |
| 6,802,213 B1 | 10/2004 | Agrotis |
| 6,804,999 B2 | 10/2004 | Okubo |
| 6,822,603 B1 | 11/2004 | Crimmins et al. |
| 6,828,905 B2 | 12/2004 | Normann et al. |
| 6,832,573 B2 | 12/2004 | Evans et al. |
| 6,871,157 B2 | 3/2005 | Lefaure |
| 6,879,252 B2 | 4/2005 | DeZorzi et al. |
| 6,885,282 B2 | 4/2005 | Desai |
| 6,885,292 B2 | 4/2005 | Katou |
| 6,885,293 B2 | 4/2005 | Okumura |
| 6,885,296 B2 | 4/2005 | Hardman et al. |
| 6,888,471 B2 | 5/2005 | Elsner et al. |
| 6,897,770 B2 | 5/2005 | Lill |
| 6,904,796 B2 | 6/2005 | Pacsai et al. |
| 6,906,624 B2 | 6/2005 | McClelland et al. |
| 6,910,627 B1 | 6/2005 | Simpson-Young et al. |
| 6,914,523 B2 | 7/2005 | Munch et al. |
| 6,915,146 B1 | 7/2005 | Nguyen et al. |
| 6,915,229 B2 | 7/2005 | Taguchi et al. |
| 6,919,798 B2 | 7/2005 | Ide |
| 6,920,785 B2 | 7/2005 | Toyofuku |
| 6,922,140 B2 | 7/2005 | Hernando et al. |
| 6,927,679 B2 | 8/2005 | Taguchi et al. |
| 6,941,803 B2 | 9/2005 | Hirohama et al. |
| 6,972,671 B2 | 12/2005 | Normann et al. |
| 6,983,649 B2 | 1/2006 | Katou |
| 6,996,418 B2 | 2/2006 | Teo et al. |
| 7,002,455 B2 | 2/2006 | Buck et al. |
| 7,010,968 B2 | 3/2006 | Stewart et al. |
| 7,015,801 B1 | 3/2006 | Juzswik |
| 7,017,403 B2 | 3/2006 | Normann et al. |
| 7,034,661 B2 | 4/2006 | Lonsdale et al. |
| 7,039,397 B2 | 5/2006 | Chuey |
| 7,042,348 B2 | 5/2006 | Schulze et al. |
| 7,050,794 B2 | 5/2006 | Chuey et al. |

(56) References Cited

U.S. PATENT DOCUMENTS

| | | |
|---|---|---|
| 7,084,749 B1 | 8/2006 | Honeck et al. |
| 7,084,751 B2 | 8/2006 | Klamer |
| 7,088,226 B2 | 8/2006 | McClelland et al. |
| 7,095,316 B2 | 8/2006 | Kachouh et al. |
| 7,096,003 B2 | 8/2006 | Joao et al. |
| 7,103,460 B1 | 9/2006 | Breed |
| 7,104,438 B2 | 9/2006 | Benedict |
| 7,113,083 B2 | 9/2006 | Suitsu |
| 7,116,213 B2 | 10/2006 | Thiesen et al. |
| 7,116,218 B2 | 10/2006 | Ogawa et al. |
| 7,120,430 B2 | 10/2006 | Christenson et al. |
| 7,137,296 B2 | 11/2006 | Shida et al. |
| 7,148,793 B2 | 12/2006 | Lin |
| 7,161,466 B2 | 1/2007 | Chuey |
| 7,161,476 B2 | 1/2007 | Hardman et al. |
| 7,164,117 B2 | 1/2007 | Breed et al. |
| 7,173,520 B2 | 2/2007 | Desai et al. |
| 7,224,269 B2 | 5/2007 | Miller et al. |
| 7,243,535 B2 | 7/2007 | Shimura |
| 7,254,994 B2 | 8/2007 | Schulze et al. |
| 7,307,480 B2 | 12/2007 | Shiu et al. |
| 7,315,240 B2 | 1/2008 | Watabe |
| 7,318,162 B2 | 1/2008 | Rineer et al. |
| 7,369,491 B1 | 5/2008 | Beshai et al. |
| 7,380,450 B2 | 6/2008 | Durif |
| 7,382,239 B2 | 6/2008 | Song et al. |
| 7,414,523 B2 | 8/2008 | Li et al. |
| 7,453,350 B2 | 11/2008 | Kachouh et al. |
| 7,478,554 B2 | 1/2009 | Roth et al. |
| 7,508,762 B2 | 3/2009 | Ohtani |
| 7,512,109 B2 | 3/2009 | Trott et al. |
| 7,518,495 B2 | 4/2009 | Tang et al. |
| 7,519,011 B2 | 4/2009 | Petrus et al. |
| 7,535,841 B1 | 5/2009 | Beshai et al. |
| 7,642,904 B2 | 1/2010 | Crano |
| 7,663,502 B2 | 2/2010 | Breed |
| 7,688,192 B2 | 3/2010 | Kenny et al. |
| 7,697,497 B2 | 4/2010 | Grube et al. |
| 7,817,543 B2 | 10/2010 | Beshai et al. |
| 7,884,707 B2 | 2/2011 | Wittliff et al. |
| 7,885,603 B2 | 2/2011 | Santavicca |
| 7,895,886 B2 | 3/2011 | Tozawa et al. |
| 7,900,198 B2 | 3/2011 | Kasman |
| 7,948,364 B2 | 5/2011 | Lin et al. |
| 8,013,725 B2 | 9/2011 | Murata et al. |
| 8,015,864 B2 | 9/2011 | Petrucelli |
| 8,019,323 B2 | 9/2011 | Jheng et al. |
| 8,027,359 B2 | 9/2011 | Iwamura |
| 8,031,598 B2 | 10/2011 | Beshai et al. |
| 8,035,257 B2 | 10/2011 | Fornage |
| 8,049,533 B1 | 11/2011 | Lin |
| 8,082,579 B2 | 12/2011 | Shimizu et al. |
| 8,155,617 B2 | 4/2012 | Magnusson et al. |
| 8,185,093 B2 | 5/2012 | Jheng et al. |
| 8,319,378 B2 | 11/2012 | Fornage |
| 8,330,594 B2 | 12/2012 | Suzuki et al. |
| 8,332,104 B2 | 12/2012 | Greer et al. |
| 8,576,060 B2 | 11/2013 | Deniau et al. |
| 9,259,980 B2 | 2/2016 | Deniau et al. |
| 2001/0050611 A1 | 12/2001 | Achterholt |
| 2002/0030592 A1 | 3/2002 | Laitsaari et al. |
| 2002/0059825 A1 | 5/2002 | Lundqvist |
| 2002/0067285 A1 | 6/2002 | Lill |
| 2002/0075145 A1 | 6/2002 | Hardman et al. |
| 2002/0084895 A1 | 7/2002 | Dixit et al. |
| 2002/0086708 A1 | 7/2002 | Teo et al. |
| 2002/0087250 A1 | 7/2002 | Pascai |
| 2002/0121132 A1 | 9/2002 | Breed et al. |
| 2002/0126005 A1 | 9/2002 | Hardman et al. |
| 2002/0130803 A1 | 9/2002 | Conway et al. |
| 2002/0144134 A1 | 10/2002 | Watanabe et al. |
| 2002/0168795 A1 | 11/2002 | Schuumans |
| 2002/0186320 A1 | 12/2002 | Carlsgaard |
| 2002/0190852 A1 | 12/2002 | Lin |
| 2003/0005759 A1 | 1/2003 | Breed et al. |
| 2003/0009270 A1 | 1/2003 | Breed |
| 2003/0030553 A1 | 2/2003 | Schofield et al. |
| 2003/0050070 A1 | 3/2003 | Mashinsky et al. |
| 2003/0071723 A1 | 4/2003 | Tang et al. |
| 2003/0079537 A1 | 5/2003 | Luce |
| 2003/0080860 A1 | 5/2003 | Stewart et al. |
| 2003/0080861 A1 | 5/2003 | Okubo |
| 2003/0095553 A1 | 5/2003 | Shiomoto et al. |
| 2003/0110851 A1 | 6/2003 | Tsujita |
| 2003/0112138 A1 | 6/2003 | Marguet et al. |
| 2003/0117276 A1 | 6/2003 | Marguet et al. |
| 2003/0117277 A1 | 6/2003 | Marguet et al. |
| 2003/0122660 A1 | 7/2003 | Kachouh et al. |
| 2003/0131297 A1 | 7/2003 | Fischel et al. |
| 2003/0179082 A1 | 9/2003 | Ide |
| 2003/0197594 A1 | 10/2003 | Olson et al. |
| 2003/0197595 A1 | 10/2003 | Olson et al. |
| 2003/0197603 A1 | 10/2003 | Stewart et al. |
| 2003/0197604 A1 | 10/2003 | Ogawa et al. |
| 2003/0201783 A1 | 10/2003 | Steber et al. |
| 2003/0228879 A1 | 12/2003 | Witkowski |
| 2004/0027241 A1 | 2/2004 | Forster |
| 2004/0039509 A1 | 2/2004 | Breed |
| 2004/0041698 A1 | 3/2004 | Lin |
| 2004/0061601 A1 | 4/2004 | Freakes |
| 2004/0113765 A1 | 6/2004 | Suitsu |
| 2004/0130442 A1 | 7/2004 | Breed et al. |
| 2004/0149025 A1 | 8/2004 | Toyofuku |
| 2004/0172179 A1 | 9/2004 | Miwa |
| 2004/0174246 A1 | 9/2004 | Mitchell |
| 2004/0203370 A1 | 10/2004 | Luo et al. |
| 2004/0215382 A1 | 10/2004 | Breed et al. |
| 2005/0024194 A1* | 2/2005 | Ide ............... B60C 23/0408 340/445 |
| 2005/0039103 A1 | 2/2005 | Azenko et al. |
| 2005/0046584 A1 | 3/2005 | Breed |
| 2005/0075145 A1 | 4/2005 | Dvorak et al. |
| 2005/0104722 A1 | 5/2005 | Tang et al. |
| 2005/0132792 A1 | 6/2005 | Lemense et al. |
| 2005/0134446 A1 | 6/2005 | Stewart et al. |
| 2005/0156722 A1 | 7/2005 | McCall et al. |
| 2005/0179530 A1 | 8/2005 | Stewart et al. |
| 2005/0192727 A1 | 9/2005 | Shostak et al. |
| 2005/0264405 A1 | 12/2005 | Ueda |
| 2006/0001535 A1 | 1/2006 | Hafele et al. |
| 2006/0006992 A1 | 1/2006 | Daiss et al. |
| 2006/0012475 A1 | 1/2006 | Froitzheim et al. |
| 2006/0017554 A1 | 1/2006 | Stewart et al. |
| 2006/0022813 A1 | 2/2006 | Schulze et al. |
| 2006/0025897 A1 | 2/2006 | Shostak et al. |
| 2006/0044125 A1 | 3/2006 | Pierbon |
| 2006/0114107 A1 | 6/2006 | Kim et al. |
| 2006/0145829 A1 | 7/2006 | Watabe |
| 2006/0148456 A1 | 7/2006 | Chuey |
| 2006/0152342 A1 | 7/2006 | Turner et al. |
| 2006/0161327 A1 | 7/2006 | Emmerich et al. |
| 2006/0187014 A1 | 8/2006 | Li et al. |
| 2006/0192661 A1 | 8/2006 | Geradiere |
| 2006/0201241 A1 | 9/2006 | Durif |
| 2006/0217850 A1 | 9/2006 | Geerlings et al. |
| 2006/0235641 A1 | 10/2006 | Fink et al. |
| 2006/0273889 A1 | 12/2006 | Schulze et al. |
| 2006/0277989 A1 | 12/2006 | Lee et al. |
| 2007/0063814 A1 | 3/2007 | Olson et al. |
| 2007/0069947 A1 | 3/2007 | Banet et al. |
| 2007/0090936 A1 | 4/2007 | Nornes |
| 2007/0176736 A1 | 8/2007 | Chuey et al. |
| 2007/0182531 A1 | 8/2007 | Kuchler |
| 2007/0190993 A1 | 8/2007 | Chuey et al. |
| 2007/0194898 A1 | 8/2007 | Fukumori |
| 2007/0210920 A1 | 9/2007 | Panotopoulos |
| 2007/0213951 A1 | 9/2007 | Van Eeden |
| 2007/0223484 A1 | 9/2007 | Crowle et al. |
| 2007/0247294 A1 | 10/2007 | Baader et al. |
| 2007/0279201 A1 | 12/2007 | Casey et al. |
| 2008/0001729 A1 | 1/2008 | Kyllmann et al. |
| 2008/0024287 A1 | 1/2008 | Boyle et al. |
| 2008/0037458 A1 | 2/2008 | Myszne |
| 2008/0062880 A1 | 3/2008 | Yew et al. |

(56) References Cited

U.S. PATENT DOCUMENTS

| | | |
|---|---|---|
| 2008/0080447 A1 | 4/2008 | Grube et al. |
| 2008/0094198 A1 | 4/2008 | Yu |
| 2008/0100430 A1 | 5/2008 | Kochie et al. |
| 2008/0141766 A1 | 6/2008 | Roth et al. |
| 2008/0143593 A1 | 6/2008 | Graziano et al. |
| 2008/0157954 A1 | 7/2008 | Tsuchida |
| 2008/0165688 A1 | 7/2008 | Beshai et al. |
| 2008/0173082 A1 | 7/2008 | Hettle et al. |
| 2008/0177441 A1 | 7/2008 | Marlett et al. |
| 2008/0204217 A1 | 8/2008 | Costello et al. |
| 2008/0205553 A1 | 8/2008 | Costello et al. |
| 2008/0211672 A1 | 9/2008 | Pei |
| 2008/0240283 A1 | 10/2008 | Iwamura |
| 2008/0256260 A1 | 10/2008 | Magnusson et al. |
| 2008/0282965 A1 | 11/2008 | Crano |
| 2008/0285507 A1 | 11/2008 | Mukherjee et al. |
| 2008/0320243 A1 | 12/2008 | Mitsuzuka et al. |
| 2009/0021362 A1 | 1/2009 | Kochie |
| 2009/0033478 A1 | 2/2009 | Deniau et al. |
| 2009/0045930 A1 | 2/2009 | Fu |
| 2009/0067854 A1 | 3/2009 | Yokogawa et al. |
| 2009/0070863 A1 | 3/2009 | Shimizu et al. |
| 2009/0108992 A1 | 4/2009 | Shafer |
| 2009/0109012 A1 | 4/2009 | Petrucelli |
| 2009/0179747 A1 | 7/2009 | Lin et al. |
| 2009/0184815 A1 | 7/2009 | Suzuki et al. |
| 2009/0207859 A1 | 8/2009 | Beshai et al. |
| 2009/0224901 A1 | 9/2009 | Yu |
| 2009/0231114 A1 | 9/2009 | Yu |
| 2009/0245803 A1 | 10/2009 | Garner et al. |
| 2009/0267751 A1* | 10/2009 | Wittliff ............... B60C 23/0408 340/442 |
| 2009/0291710 A1 | 11/2009 | Jheng et al. |
| 2009/0310477 A1 | 12/2009 | Lee et al. |
| 2010/0071453 A1 | 3/2010 | Isono |
| 2010/0308987 A1 | 12/2010 | Haas et al. |
| 2011/0140876 A1 | 6/2011 | Deniau |
| 2011/0181321 A1 | 7/2011 | Matsudera |
| 2011/0211414 A1 | 9/2011 | Musha |
| 2011/0250860 A1 | 10/2011 | Lin |
| 2011/0267024 A1 | 11/2011 | Halberstadt |
| 2011/0294548 A1 | 12/2011 | Jheng et al. |
| 2012/0001745 A1* | 1/2012 | Li ....................... B60C 23/0408 340/445 |
| 2012/0117788 A1 | 5/2012 | Deniau |
| 2012/0119895 A1 | 5/2012 | Deniau |
| 2012/0139751 A1 | 6/2012 | Lin |
| 2012/0147184 A1 | 6/2012 | Siann et al. |
| 2012/0185110 A1 | 7/2012 | Deniau et al. |
| 2012/0274461 A1 | 11/2012 | Colombo et al. |
| 2013/0282231 A1 | 10/2013 | Farr et al. |
| 2014/0139332 A1 | 5/2014 | Mouchet |
| 2015/0015389 A1 | 1/2015 | McIntyre et al. |
| 2015/0015390 A1 | 1/2015 | McIntyre et al. |

FOREIGN PATENT DOCUMENTS

| | | |
|---|---|---|
| DE | 19720123 | 7/1998 |
| DE | 19924830 | 11/2000 |
| DE | 10014076 | 10/2001 |
| DE | 10040238 | 3/2002 |
| DE | 10247761 | 6/2003 |
| DE | 10217239 | 7/2003 |
| DE | 10207014 | 8/2003 |
| DE | 10307265 | 10/2003 |
| DE | 69529456 | 11/2003 |
| DE | 10247149 | 4/2004 |
| DE | 60108973 | 7/2005 |
| DE | 60202342 | 12/2005 |
| DE | 60023387 | 7/2006 |
| DE | 102005004825 | 8/2006 |
| DE | 102005059009 | 6/2007 |
| DE | 102007039599 | 3/2008 |
| DE | 102008008237 | 8/2009 |
| DE | 102008033051 | 2/2010 |
| EP | 793579 | 9/1997 |
| EP | 1026016 | 8/2000 |
| EP | 1291230 | 3/2003 |
| EP | 1428694 A2 | 12/2003 |
| EP | 1440824 A2 | 7/2004 |
| EP | 1494877 | 1/2005 |
| EP | 1536392 A1 | 6/2005 |
| EP | 1547827 | 6/2005 |
| EP | 1562162 | 8/2005 |
| EP | 1026015 | 5/2006 |
| EP | 1674299 A2 | 6/2006 |
| EP | 1352763 | 4/2008 |
| EP | 1340629 | 6/2008 |
| GB | 2387032 | 10/2003 |
| GB | 2420415 | 5/2006 |
| GB | 2500697 A | 10/2013 |
| JP | 62003537 | 1/1987 |
| JP | 63090407 A | 4/1988 |
| JP | 05107134 | 4/1993 |
| JP | 8244423 | 9/1996 |
| JP | 2000142044 | 5/2000 |
| JP | 2000238515 | 9/2000 |
| JP | 2001080321 | 3/2001 |
| JP | 2001312860 A | 9/2001 |
| JP | 2003025817 | 1/2003 |
| JP | 2003-312220 | 11/2003 |
| JP | 2004-145474 | 5/2004 |
| JP | 2005289116 | 10/2005 |
| JP | 2006015832 | 1/2006 |
| JP | 2007010427 A | 1/2007 |
| JP | 2007200081 | 8/2007 |
| JP | 2007283816 | 11/2007 |
| JP | 2008137585 | 6/2008 |
| JP | 4265448 B2 | 2/2009 |
| JP | 5502729 B2 | 5/2014 |
| KR | 2003068216 | 8/2003 |
| KR | 1020070040883 A | 4/2007 |
| KR | 10-2009-0091001 | 8/2009 |
| RU | 38461 U1 | 6/2004 |
| RU | 2238190 | 10/2004 |
| RU | 2398680 C2 | 6/2006 |
| RU | 2409480 C2 | 7/2006 |
| RU | 2352473 C1 | 4/2009 |
| WO | 9420317 | 9/1994 |
| WO | 9422693 | 10/1994 |
| WO | 9908887 | 2/1999 |
| WO | 0072463 | 11/2000 |
| WO | 0145967 | 6/2001 |
| WO | 02094588 | 11/2002 |
| WO | 03016079 | 2/2003 |
| WO | 2004038674 | 5/2004 |
| WO | 2005085651 | 9/2005 |
| WO | 2005116603 | 12/2005 |
| WO | 2007/006871 A1 | 1/2007 |
| WO | 2009006518 | 1/2008 |
| WO | 2008-103973 A1 | 8/2008 |
| WO | 2008106387 | 9/2008 |
| WO | 2008107430 | 9/2008 |
| WO | 2012/097154 A1 | 7/2012 |
| WO | 2013063061 A1 | 5/2013 |
| WO | 2013/152294 A1 | 10/2013 |
| WO | 2015/015692 A1 | 2/2015 |

OTHER PUBLICATIONS

"Philips Magnavox 4 Function with Back Lighted Keypad Universal Remote" Operating Instructions, printed Oct. 2012, Philips Electronics North America Corporation.

"RadioShack 8-In-One Touch Screen Remote Control", Owner's Manual, 2001, RadioShack Corporation.

Kais Mnif, "A Smart Tire Pressure Monitoring System", Sensors Magazine, Nov. 1, 2001.

International Search Report and Written Opinion dated Sep. 28, 2012, from corresponding International Patent Application No. PCT/US2011/047112.

International Search Report dated Apr. 6, 2012, from corresponding International Patent Application No. PCT/US2011/047087.

(56) References Cited

OTHER PUBLICATIONS

International Search Report and Written Opinion mailed on Oct. 15, 2008, for Application No. PCT/US2008/069006.
International Preliminary Report on Patentability mailed on Jan. 14, 2010, for Application No. PCT/US2008/069006.
Chinese Office Action mailed on Apr. 19, 2011, for Chinese Application 200880023390.7 (Corresponding to PCT/US2008/069006).
Chinese Office Action (second) mailed on Feb. 16, 2012, for Chinese Application 200880023390.7 (Corresponding to PCT/US2008/069006).
Chinese Office Action (third) mailed on Oct. 10, 2012, for Chinese Application 200880023390.7 (Corresponding to PCT/US2008/069006).
Japanese Office Action mailed on Jun. 7, 2012, for JP Application 2010-515252 (Corresponding to PCT/US2008/069006).
International Search Report and Written Opinion dated Sep. 28, 2012, from corresponding International Patent Application No. PCT/US2011/047104.
Germany Office Action dated Nov. 19, 2012.
Germany Office Action dated Sep. 17, 2007.
Preliminary Invalidity Contentions of Defendant Continental Automotive Systems US, Inc.; dated Jan. 17, 2012, , In the United States District Court for Western District of Virginia Lynchburg Division, Civil Action No. 6:11-CV-00014-NKM.
Amended Invalidity Contentions of Defendant Continental Automotive Systems US, Inc.; dated Jun. 18, 2012, , In the United States District Court for Eastern District of Michigan Southern Division, Civil Action No. 2:12-cv-10715-SJM-MJH.
Plaintiffs' Initial Infringement Contentions; dated Dec. 15, 2011, In the United States District Court for Western District of Virginia Lynchburg Division, Civil Action No. 6:11-CV-00014-NKM-RSB.
Joint Claim Construction and Prehearing Statement, dated Jun. 11, 2012, from co-pending litigation: *Schrader-Bridgeport Int'l, Inc.* v. *Continental Automotive Sys, US, Inc.*, case docket No. 2:12-cv-10715-SJM-MJH, (filed Feb. 16, 2012, E.D. Mich.).
Plaintiffs' Opening Claim Construction Brief, dated Jun. 26, 2012, from co-pending litigation: *Schrader-Bridgeport Int'l, Inc.* v. *Continental Automotive Sys. US, Inc.*, case docket No. 2:12-cv-10715-SJM-MJH, (filed Feb. 16, 2012, E.D. Mich.).
USPTO Translation of JP2003025817A, translated from Japanese by Schreiber Translations, Inc., Feb. 2013.
Jeff Burgess, "TPMS Demonstration Kit", AN1943/D, Rev 1, Apr. 2002, Motorola, Inc., 2002 (16 pgs.).
Search Report dated Jun. 20, 2014 , from EP Patent Application No. 11870613.4.
Search Report dated Jun. 30, 2014 , from EP Patent Application No. 11870701.7.
Search Report dated Mar. 24, 2015, from EP Patent Application No. 11870650.6.
Search Report dated Apr. 19, 2012, from International Patent Application No. PCT/US2012/021082.
Search Report dated Aug. 20, 2015, from GB Patent Application No. GB1503824.3.
Machine Translation of RU2423246 C1.
Translation of Abstract of KR1020070040883A.
International Search Report mailed on Jun. 11, 2015 for application PCT/US2015/016182.
International Search Report and Written Opinion dated Sep. 28, 2012, from corresponding International Patent Application No. PCT/US2011/047108.
Jeff Burgess, "Tire Pressure Monitoring System Reference Design", Tire Pressure Monitor System Demo, AN1951/D, Rev 1, May 2003, Motorola, Inc., 2003 (24 pgs.).
"Motorola's MPXY8000 Series Tire Pressure Monitoring Sensors", Motorola Sensor Products Division Transportation & Standard Products Group, Motorola, Inc., May 2003 (22 pgs.).
Alfred Pohl et al. "Wirelessly Interrogable Surface Acoustic Wave Sensors for Vehicular Applications", IEEE Transactions on Instrumentation and Measurement vol. 46, No. 4, IEEE, Aug. 1997 (8 pgs . . . ).
"Tire pressure Warning System Using Direct Measurement Method (SOARER)" G0880A ISSN: 0388-3841, vol. 51 No. 7, pp. 174-179, Toyota Motor Corporation, May 2, 2002 (6 pgs.).

* cited by examiner

TIRE PRESSURE MONITOR SYSTEM APPARATUS AND METHOD

CROSS-REFERENCE TO RELATED APPLICATIONS

This patent claims benefit under 35 U.S.C. 119(e) to U.S. Provisional Application No. 62/200,528 entitled "Apparatus, System and Method for Configuring Tire Information Sensor with a Transmission Protocol Based on Vehicle Trigger Characteristics" filed Aug. 3, 2015. This patent is also a continuation-in-part of application Ser. No. 14/190,905 (which issued as U.S. Pat. No. 9,193,222) filed Feb. 26, 2014 entitled "Apparatus and Method for Cloning Tire Pressure Monitor System Information." This patent is also a continuation-in-part of application Ser. No. 14/524,836 (which issued as U.S. Pat. No. 9,259,980) entitled "Apparatus and Method for Data Transmissions in a Tire Pressure Monitor," and filed Oct. 27, 2014, which is a continuation of U.S. Pat. No. 9,024,743 entitled "Apparatus and Method For Activating a Localization Process For A Tire Pressure Monitor" and filed Aug. 9, 2011, the contents of all of which are incorporated herein by reference in their entireties.

TECHNICAL FIELD

This application relates to tire pressure monitors system (TPMS) sensors, and transmissions made from these sensors.

BACKGROUND OF THE INVENTION

Tire pressuring monitoring (TPM) devices are used in today's vehicles. A tire pressure sensor senses the tire pressure reading (or other conditions, such as the temperature of the tire). These sensed readings may be communicated to a TPM receiver that is disposed in the vehicle. A display screen may also be coupled to the receiver. When the tire pressure reading falls below a particular threshold, the driver of the vehicle may be alerted, for example, by an alert message being displayed to the driver on the screen. The driver can then take any required action.

The transmissions made from the TPM sensor (transmitter) to the TPM receiver (e.g., in the vehicle) are made according to various types of formats. For instance, different automobile manufacturers use different formats. The formats relate to the positioning of data, the number of bits, the meaning of the bits, the transmission rate, the baud rate, and error-handling approaches, to mention a few examples.

In some approaches, each TPM sensor needs to be manually and individually programmed with the desired transmission format or protocol. Current approaches for programming the individual TPM sensors typically involve the use of a hand-held programming device. An operator manually programs the TPM sensor with the selected protocol or format according to the desired automobile manufacturer. Unfortunately, the manual programming approach is error prone, time-consuming, and inefficient.

BRIEF DESCRIPTION OF THE DRAWINGS

For a more complete understanding of the disclosure, reference should be made to the following detailed description and accompanying drawings wherein.

Figure 1:
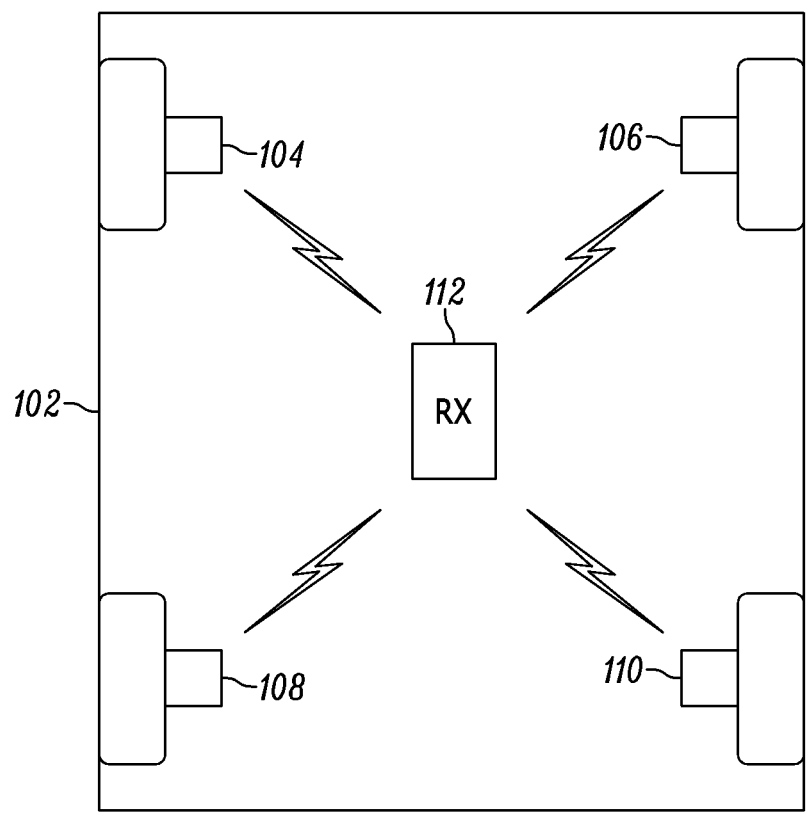
FIG. 1 comprises a block diagram of a system for cloning TPMS information according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided where a first tire pressure monitoring system (TPMS) wheel unit (or programming tool) is configured to receive a "shell unit" transmission from a second wheel unit. The entire transmission (or selected parts of the transmission) are stored, for example, in a memory at the first wheel unit (or the tool). For instance, the decoded data or the entire physical layer transmission such as the entire burst) may be stored. The unit (or tool) identifies the data in the transmission that changes over time (such as the pressure and temperature information to mention a few examples). Alternatively, based upon the transmission characteristic of the first signal transmission, determining a corresponding at least one protocol. The wheel unit (or tool) overwrites the updated information (e.g., tire pressure data associated with the tire of the first wheel unit) into the identified location. Consequently, only the information that changes is modified while static, unchanging information remains unmodified. The modified transmission can then be made from the second wheel unit (or the tool).

In some aspects, the present approaches provide a "record and play" technique to clone a TPMS wheel unit so that no specific protocol or code needs to be utilized or programmed. Since the entire transmission is recorded and played back, all the portions of the data format that do not change are automatically produced while only data that changes is dropped and new data is inserted in the place of the changing data. This greatly simplifies development, especially software development of the TPMS monitor. For example, rather than develop software to build the data format in real time during normal operation, the entire format is simply stored in memory with only substituting the requisite data such as pressure, temperature, battery voltage or other suitable data. As a result, the complexity of software is greatly reduced, and memory such as ROM and any RAM is significantly reduced, thus reducing both labor and material/hardware costs.

In other aspects, TPMS cloning without a scan tool is also accomplished. As a result, users do not need to purchase or utilize scan tools. Another advantage is that the TPMS monitor does not need an HF receiver since the LF receiver is already in the sensor to receive LF signals during for example learn mode. Thus, no additional hardware such as an HF receiver is required. Further, since the TPMS monitor may determine a particular protocol, or a group of protocols out of several protocols, the wheel unit may configure the data transmissions to communicate with several different manufacturers protocols. For example, multi-application/multi-protocol sensors may be aftermarket sensors that are pre-programmed or configured with a variety of vehicle protocols/software. A single protocol sensor may transmit according to a single protocol that typically includes a burst sequence of one, two three or more frame types. A multi-protocol sensor may have a multiprotocol burst sequence of different bursts. Each of the different bursts may have frames from different manufacturers. The different multiprotocol bursts may be different from the bursts of the manufacturer. Since the receivers process only those frames according to the preprogrammed protocol, the receiver rejects the frames from other manufacturer protocols and thus receives the correct frames intended for the receiver according to the manufacturer protocol. Thus the multiprotocol sensor will have a new type of transmission that is a multiprotocol burst sequence. Among other advantages, the TPMS monitor simply may have the entire data format such as the multi-protocol burst sequence either stored in memory initially during manufacture, or during the learn mode of operation with the vehicle. For example, the sensor may contain several different multiprotocol burst sequences (MTBS) that correspond to groups of automotive vehicle platforms. Thus the sensor may receive an LF a first data transmission according to a manufacturer's protocol, determine which set of MTBS corresponds to that first data transmission and then transmit a second data transmission according to a second multiprotocol burst sequence. In another embodiment, a first data transmission and a second data transmission from a TPMS monitor are received. The first data transmission and the second data transmission are stored in a memory. The first data transmission and the second data transmission are compared and at least one changing portion of the data transmission is identified based upon the comparison. Sensed data is received from a tire pressure sensor. A data resolution is determined and a third data transmission is formed. The changing portion is replaced with the sensed data in the third data transmission according to the resolution. The third data transmission is transmitted including the sensed data with the proper resolution.

In some aspects, a resolution associated with a particular automobile manufacture is determined and the changing portion with the new data according to this resolution. In some examples, the sensed data is tire pressure information. In other examples, the sensed data is tire temperature information. Other types of data can also be written into the changing portion of the transmission.

In some other aspects, the resolution is determined utilizing a plurality of graphs stored in a memory. In other aspects, the plurality of graphs are linear graphs.

In others of these embodiments, an apparatus for cloning tire pressure information includes an interface, a memory and a controller. The interface has an input and an output and the input is configured to receive a first data transmission and a second data transmission from a TPMS monitor.

The controller is coupled to the memory and the interface. The controller is configured to store the first data transmission and the second data transmission in the memory. The controller is configured to compare the first data transmission and the second data transmission, and identify at least one changing portion of the data transmission based upon the comparison. The controller is also configured to receive sensed data from a tire pressure sensor at the input, and to determine a data resolution, and to form a third data transmission. The controller is configured to replace the at least one changing portion of the third data transmission with the sensed data according to the resolution. The controller is configured to transmit the third data transmission including the sensed data with the proper resolution at the output of the interface.

Referring now to FIG. 1, one example of a TPMS system 100 is described. The TPMS system resides in a vehicle 102. The system includes a first TPMS monitor (or sensor or unit or wheel unit) 104, a second TPMS monitor 106, a third TPMS monitor 108, and a fourth TPMS monitor 110. The monitors 104, 106, 108, and 110 communicate with a receiver 112. The communication between the TPMS monitors 104, 106, 108, and 110 and the receiver 112 is accomplished in one aspect via wireless, radio frequency (RF) links.

The TPMS monitors 104, 106, 108, and 110 may include processing devices and memories and execute computer instructions to sense and transmit tire pressure (or other) data. In these regards, the TPMS monitors 104, 106, 108, and 110 may themselves include structures, devices, or apparatus that actually sense the pressure (or other types of data) in the tire.

The receiver 112 includes hardware and/or software to receive (and in some examples transmit) information from the TPMS monitors 104, 106, 108, and 110. The receiver 112 is disposed at an appropriate location within the vehicle 102.

When the value of the sensed data communicated from one of the sensors 104, 106, 108 and 110 falls below a predetermined threshold (e.g., below a predetermined pressure value), this data is received at the receiver 112, and a determination is made at the receiver 112 to alert the driver/or other occupant of vehicle 102. The alert may be made via a screen coupled to the receiver 112. Other types of alerts (e.g., audio alerts) may also be issued. Although the approaches described herein are described as being implemented at a wheel unit, it will be appreciated that the approaches may also be implemented at a hand held scanning tool or other similar device.

In one aspect, the location of the pressure information in the data stream transmitted by one wheel unit may be identified at another wheel unit (e.g., by looking for changes in the data stream). Then, the required resolution of the data is determined because, for example, the resolution changes between automobile manufacturers, manufacturer protocols and/or wheel units. Consequently, a pressure resolution linear extrapolation may be determined and the data stream updated with measurements according to the appropriate resolution.

In another aspect, a data stream (e.g., a series of bursts) is transmitted from one wheel unit 104, 106, 108, or 110 ("the originating wheel unit") and this data burst is to be copied or cloned, RX entire transmission, change pressure at another of the wheel units 104, 106, 108, and 110 ("the cloning wheel unit"). The pressure changes over time as the originating wheel unit 104, 106, 108, or 110 transmits (over a burst), and the originating wheel unit receives successive measurements. The cloning wheel unit receives the transmission and looks for changes in the data stream to identify pressure information/data. The changing portions of the data stream may correspond to pressure and different pressures in one example.

By "cloning" and as used herein, it is meant that a transmission from a first wheel unit is copied at another second wheel unit. The copied transmission is the same as the first transmission except that new data is inserted into the copied transmission in portions of the transmission that have been identified as changing (over time). According to one embodiment, the data format may be transmitted directly from memory rather than build the data format through routines such as loops as is known in software programming.

In still another aspect, the wheel unit 104, 106, 108, or 110 may be placed into pressure chamber and the pressure changed. Transmissions may be received at this wheel unit 104, 106, 108, or 110 and changes determined in the data stream. The changing portions of the data stream may correspond to pressure and different pressures.

In yet another aspect, transmissions are received from different wheel units 104, 106, 108, or 110, for example, the two to four units from a car coming in for wheel unit replacement.

In still another aspect, transmissions are received from wheel units 104, 106, 108, 110 while mounted on tire and wheel under pressure, and then when unmounted. This approach gives one to four measurements under pressure from four wheel units (slightly different) and another four at atmospheric pressure thereby eliminating the need for using a pressure chamber. According to another aspect, a user or technician may take out some pressure from 1 to 4 tires (e.g., from approximately 30 psi to 20-25 psi, and record transmissions at 1, 2, 3, 4 or more different pressure levels). Also, the user or technician may increase pressure from in one example 30 psi to 40-45 psi and also record the corresponding transmissions and pressure readings.

In yet another aspect (since the pressure and temperature resolution and range of data is different for a limited number of protocols), and based on one measurement such as pressure, the measurement can fit one of a limited number of curve fits or resolutions. With one or more pressure measurements the wheel unit can determine which curve or resolution is a best fit and the wheel unit can then select the correct resolution. Thus, all pressure measurements can be computed with the correct resolution and then drop/inserted into the transmission bit stream. For example, the different resolutions and data ranges can correspond to the different protocols or groups of protocols covered with the wheel unit. As such, then the wheel unit can support multiple protocols. For example a particular resolution may identify a group of related protocols that have the same or similar resolution types or settings. Thus, the transmission may be a single protocol or a group of protocols.

Figure 2:
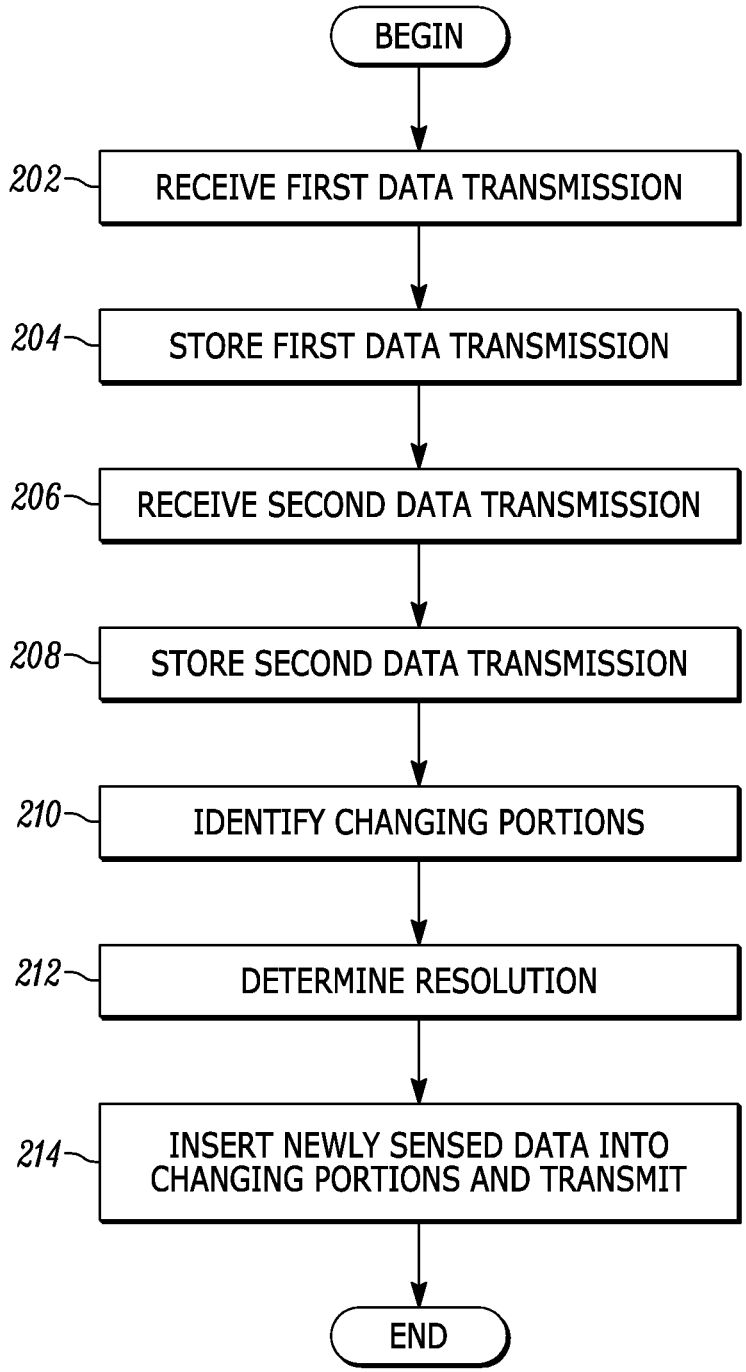
FIG. 2 comprises a flow chart of one approach for cloning TPMS information according to various embodiments of the present invention.

Referring now to FIG. 2, one example of how one wheel unit clones the transmission received from another wheel unit is described. At step 202, a first data transmission from a first wheel unit is received at a second wheel unit at (i.e., the cloning wheel unit that will be performing the cloning operation). At step 204, the first data transmission is stored at the second wheel unit. In one aspect, the data transmission is a burst of information that includes a plurality of frames, bytes, or bits to mention a few examples of the transmission units that may be included in the burst. Other examples are possible.

At step 206, a second data transmission from the first wheel unit is received at the second wheel unit. At step 208, the first data transmission is stored at the second wheel unit. As with the first transmission, the second data transmission is a burst of information that includes a plurality of frames. The burst itself may include several sub-sections with each sub-section relating to data in a format that is associated with a particular automobile manufacturer.

At step 210, the second wheel unit identifies one or more portions of the data transmission that change over time. This is accomplished by examining and comparing the received first and second transmissions (the burst) from the originating wheel unit and identifying which portion or portions (e.g., which bits, bytes, frames, or other type of data unit) changes.

At step 212, a resolution for new data is determined. The resolution may be determined by comparing the received data (for a known pressure) to various curves and determining which curve gives the best fit. At step 214, new data is inserted into the one or more portions of the transmission that change over time and this new data has the proper resolution. In one aspect, each automobile has a unique data resolution that is determined.

Figure 3:
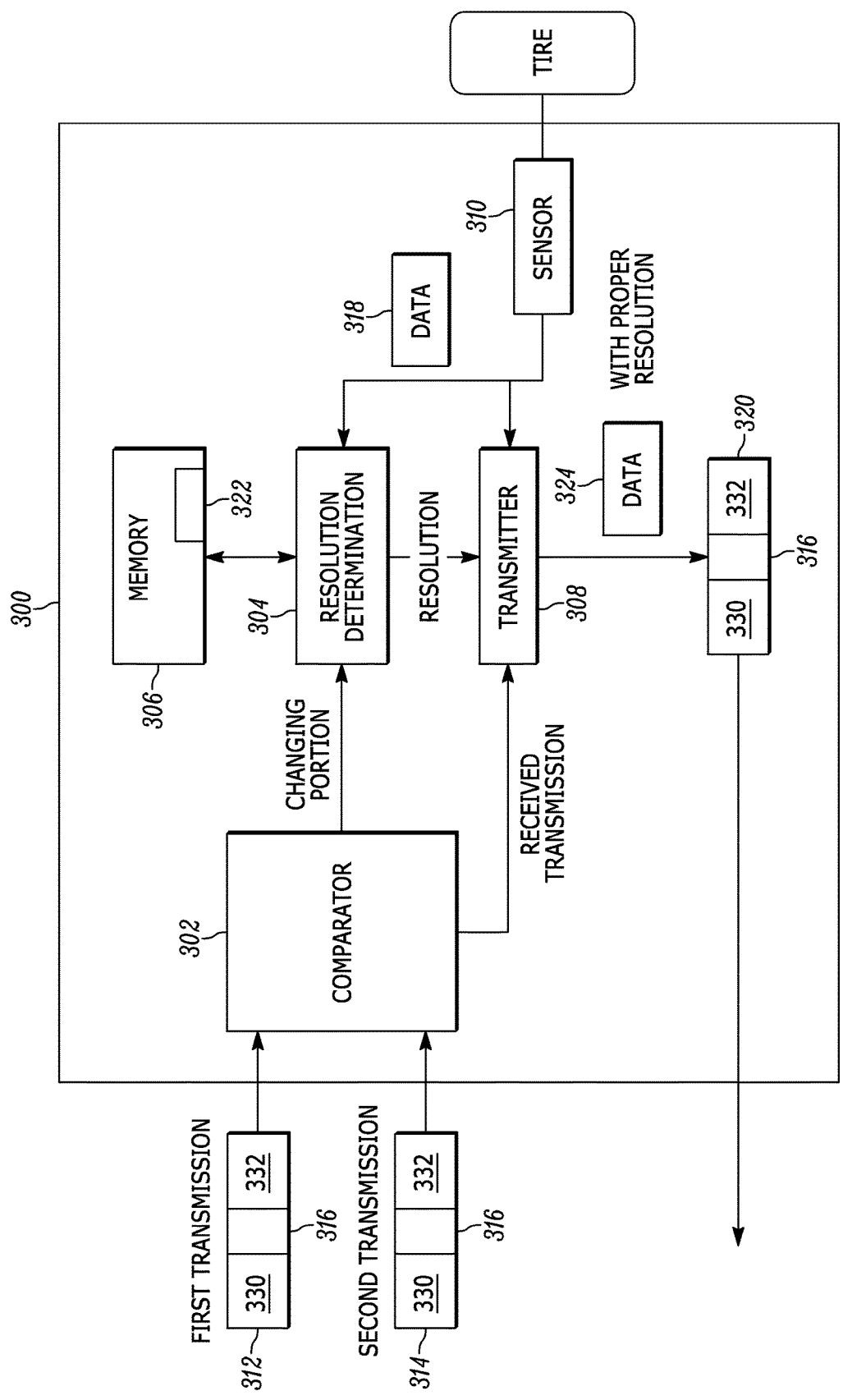
FIG. 3 comprises a block diagram of an apparatus for TPMS cloning according to various embodiments of the present invention.

Referring now to FIG. 3, one example of an apparatus 300 for cloning TPMS transmissions in a TPMS system is described. The apparatus 300 includes a comparator 302, a resolution determination module 304, a memory 306, a transmitter 308, and a sensor 310. The various elements and modules described in FIG. 3 can be implemented in hardware, software, or combinations of hardware and software.

The comparator 302 receives a first data transmission 312 and a second data transmission 314. The transmissions 312 and 314 may be, in one aspects, bursts of information. In this respect, the transmissions 312 and 314 may include transmissions made according to multiple formats. Alternatively, the transmissions 312 and 314 may include transmissions made according to a single format.

The comparator 302 compares the two transmissions 312 and 314 and based upon the comparison determines which portions 316 of the transmission change. The changing portions 316 identify where pressure (or other type of sensed) data 318 will be inserted in a third transmission 320 that will eventually be transmitted from the transmitter 308. The third transmission 320 has the same format as the transmission 312 and 314. The difference between the original transmissions 312 and 314 is that the new pressure data 318 is inserted in the changing portion 316 of the transmission 320. The remaining portions (330 and 332) of the transmissions 320 are identical to the remaining portions (330 and 332) of transmissions 312 and 314.

Forming the third transmission may involve various types of operations and approaches and may be accomplished in different ways. In one approach, the forming merely takes any transmission originating from an originating wheel unit (including the first transmission 312 or second transmission 314 or any future transmission), stores the transmission in memory (briefly, for a longer period of time, or permanently), and overwrites the changing portion with sensed data. In other examples, nothing is stored for a significant amount of time except the location of the changing portion. As new transmissions are received, they are simply retransmitted as received except the changing portion is overwritten with newly sensed data from the cloning wheel unit.

Figure 4:
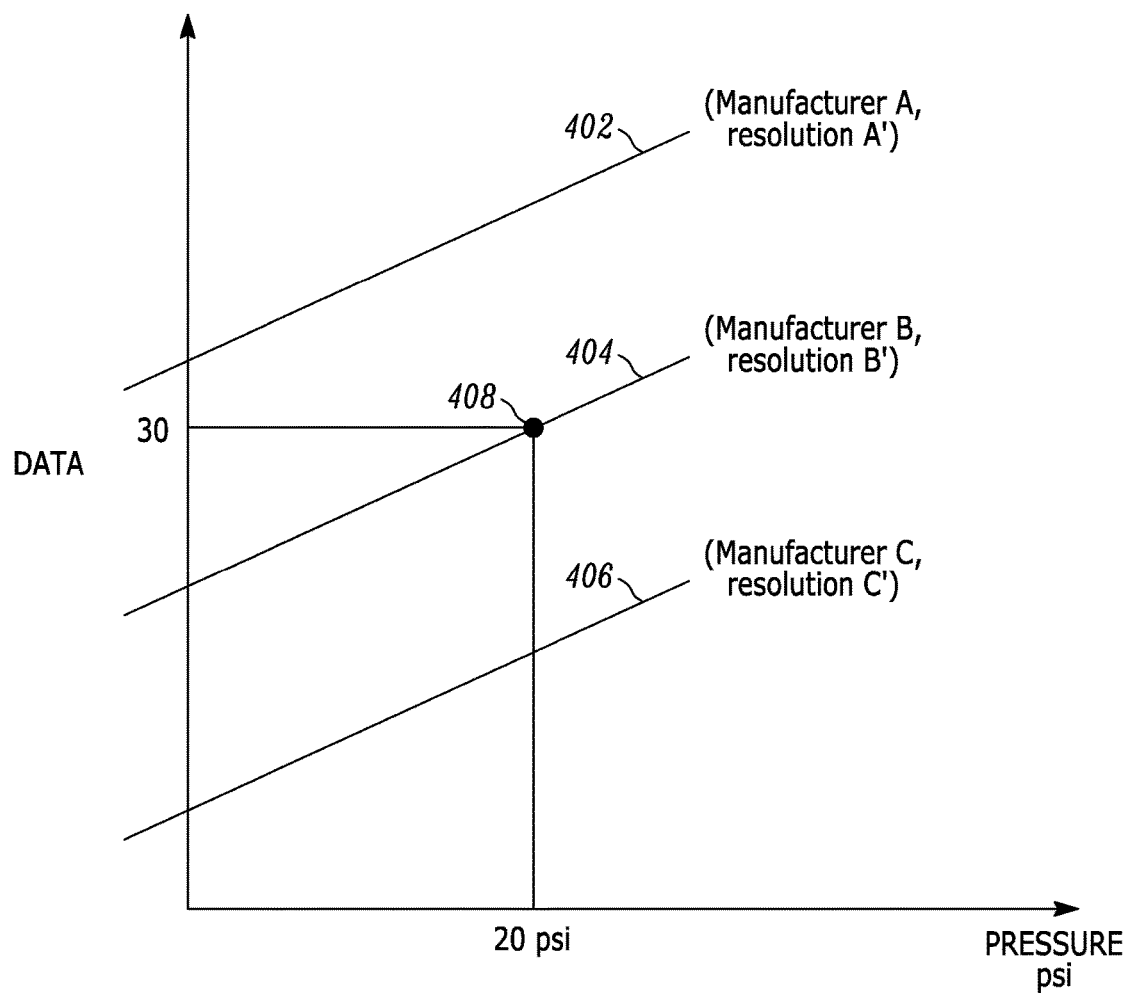
FIG. 4 comprises a graph showing various resolution curves used in determining the resolution of cloned data according to various embodiments of the present invention.

In one aspect, before the pressure data 318 is inserted into the transmission 320, it is done so according to a required or needed resolution. In this respect, the resolution determination module 304 obtains from memory 306 information 322 in order to determine the correct resolution. This process is described in greater detail below with respect to FIG. 4. In the example of FIG. 4, the pressure data is determined for a particular pressure (e.g., 30 psi) and then the graphs are examined to see (for the given pressure) which curve is the best fit. Once the best fit is determined, then the resolution has also been determined. The data 324 actually inserted into the transmission 320 has the correct resolution. As mentioned, the rest of the data in the transmission 320 is the same and is replicated from the transmissions 312 and/or 314.

Referring now to FIG. 4, one example of pressure resolution extrapolation is described. Generally speaking, a determination is first made of curves that represent the data resolution of different manufacturers. For example, 0 psi may map to hex AAAA for one manufacturer or hex 0000 for another manufacturer. In other examples, 100 psi may map to hex FFFF for the first manufacturer and AAAA for the second manufacturer. As will be appreciated, the resolution mapping between actual measurements and transmitted data is typically different for different manufacturers. This mapping must be determined or the receiver (which is expecting to receive data with a certain resolution) will not be able to recognize the transmission or will decode the data with the improper resolution (thus determining an improper value for the data).

As shown in FIG. 4, a first manufacturer has a first curve 402. A second manufacturer has a second curve 404. A third manufacturer has a third curve 406. In this example, the curves are linear and have associated with them an equation y−mx+b, where m is the slope (of a particular line) and b is the y intercept (of that line). However, it will be appreciated that the curves do not have to be linear and can be of any shape and be described by any type of equation or equations. In the graphs of FIG. 4, the x-axis represents pressure readings and the y-axis represents data values (e.g., in hex form).

In one aspect, each curve 402, 404, or 406 is determined by testing. For instance and in a test chamber, two or more data points are received. Based on pressure readings, readings for different pressure measurements and the corresponding pressure measurement, could be linear or non-linear. A slope (m) can be determined by two pressure readings as can the y-intercept. From this information, the equation y=mx+b is determined. This algorithm may be implemented in an application specific integrated circuit (ASIC) in one approach.

After the exact curve is determined (e.g., the equation describing the curve), the resolution of the pressure information that is being automatically determined. At any given pressure (e.g., 30 psi), a unique value (e.g., representing tire pressure) is transmitted by a sensing apparatus (e.g., a pressure sensing device) of a first manufacturer, another unique number by a second manufacturer, and still another unique number by a third manufacturer. So, for example, 29-31 psi may be transmitted as a hex 49 plus/minus tolerance hex for the first manufacturer, hex 29-31 for the second manufacturer, and hex 19-21 for the third manufacturer. If the actual sensed reading for 20 psi is hex 30, a comparison is made to see on which graph 402, 404, or 406 the data falls. In this case, it can be seen that this falls on point 408 on curve 404. Now, the wheel unit knows the proper resolution (the resolution associated with the curve 404) to use and the present data as well as all future data can be mapped according to the proper resolution.

Figure 5:
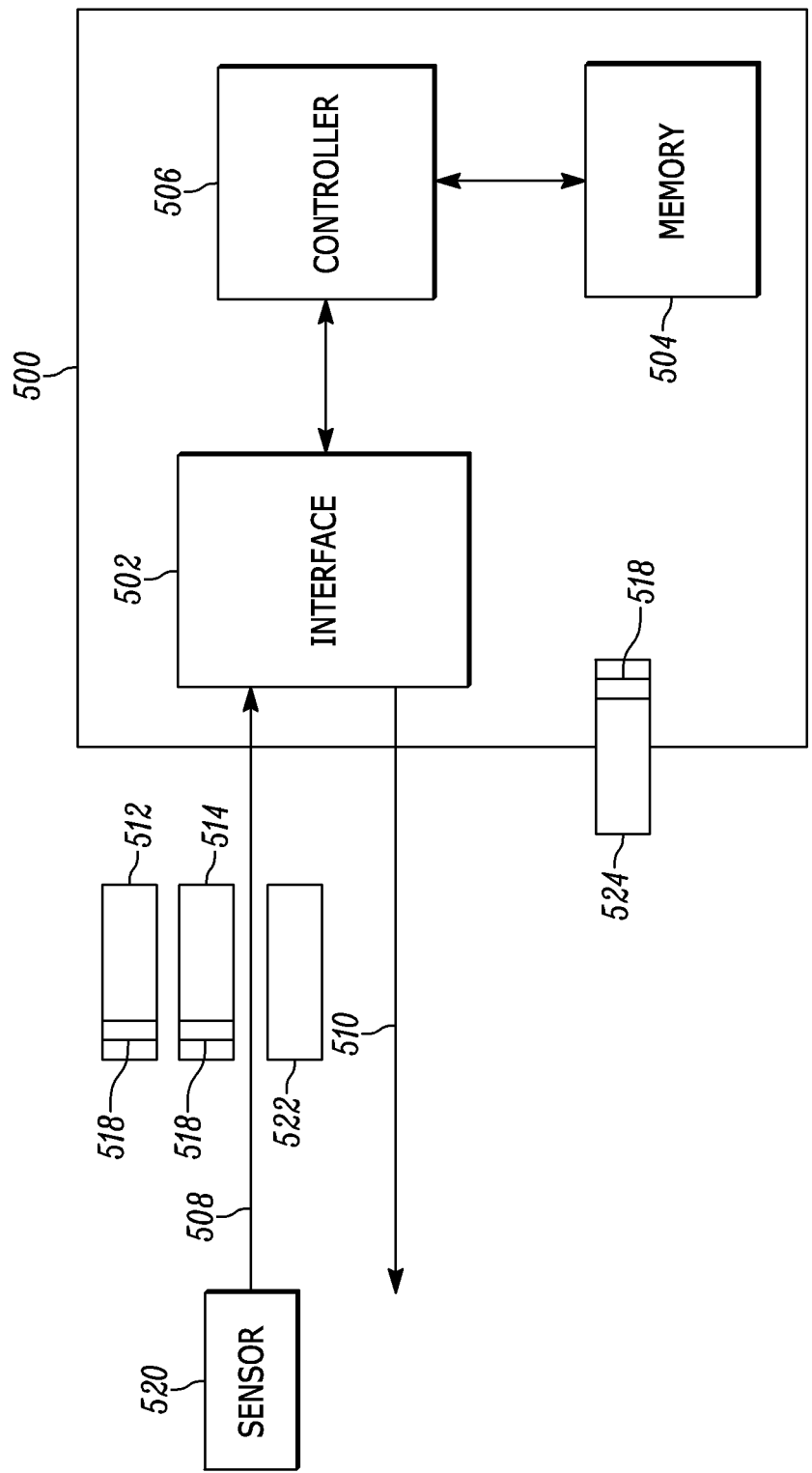
FIG. 5 comprises a block diagram of an apparatus for TPMS cloning according to various embodiments of the present invention.

Referring now to FIG. 5, an apparatus 500 for cloning tire pressure information includes an interface 502, a memory 504 and a controller 506. The interface 502 has an input 508 and an output 510 and the input 508 is configured to receive a first data transmission 512 and a second data transmission 514 from a TPMS monitor 516. The apparatus 500 may be implemented as any combination of hardware and software elements. The apparatus 500 may be disposed at a wheel unit or as a programming device used by a technician. Other placements are possible.

The controller 506 is coupled to the memory 504 and the interface 502. The controller 506 is configured to store the first data transmission 512 and the second data transmission 514 in the memory 504. The controller 506 is configured to compare the first data transmission 512 and the second data transmission 514, and identify at least one changing portion 518 of the data transmissions 512 and 514 based upon the comparison. The controller 506 is furthered configured to receive sensed data 522 from a tire pressure sensor 520 at the input 508, to determine a data resolution, and replace the at least one changing portion 518 with the sensed data 522 according to the resolution. The controller 506 is configured to transmit a third data transmission 524 including the sensed data 522 in the changing portion 518 at the output 510 of the interface 502.

Figure 6:
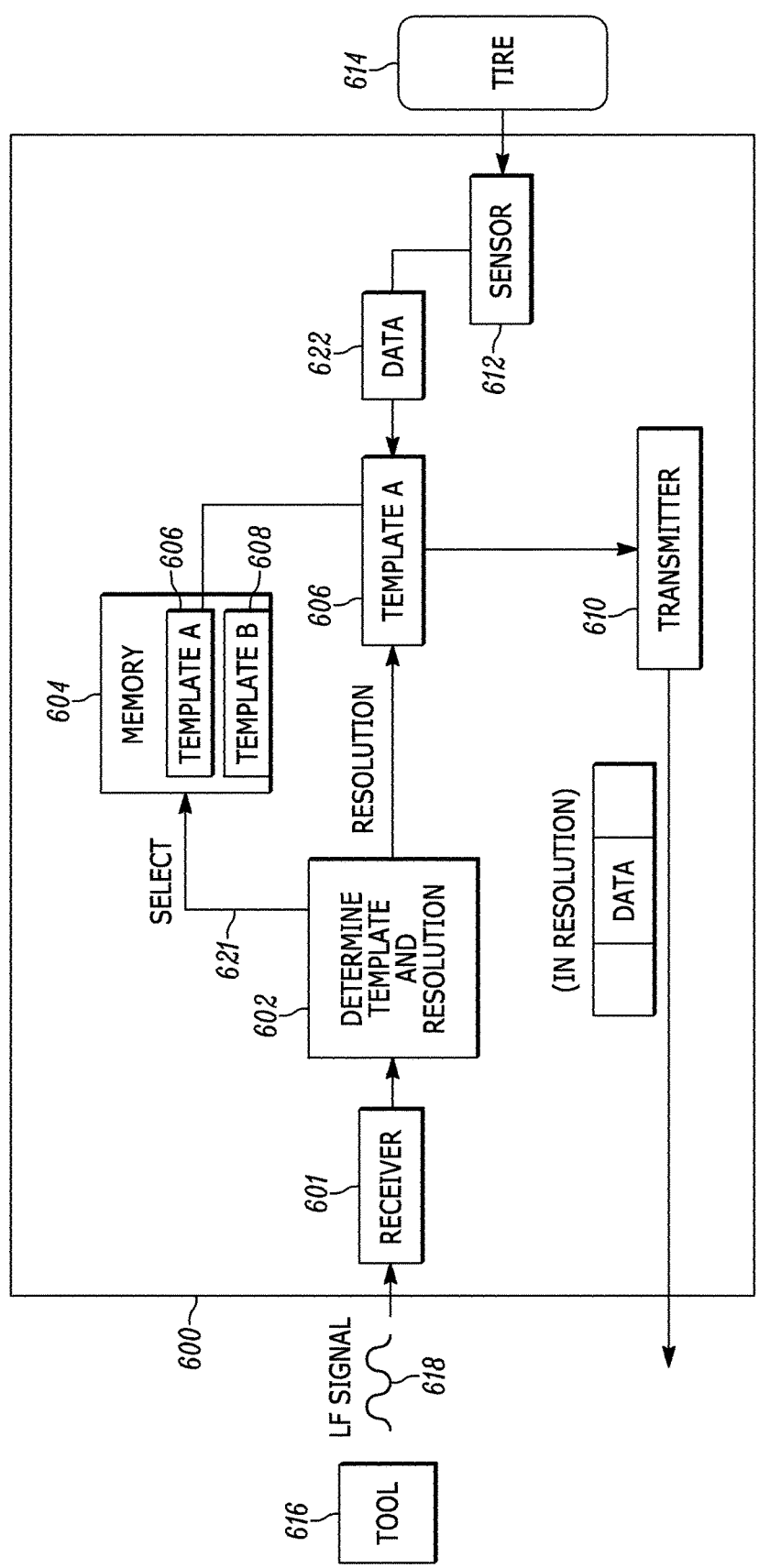
FIG. 6 comprises a block diagram of an apparatus configured to make TPMS transmissions according to various embodiments of the present invention.

Referring now to FIG. 6, an apparatus 600 (a TPMS sensor or monitor) includes a receiver 601, a determine template and resolution module 602, a memory 604 (including a first template 606, and a second template 608), a sensor 610, and a transmitter 612. The apparatus 600 may be a tire pressure monitoring (TPM) device that measures the pressure (or other attributes) of a tire 614. A portable electronic tool 616 (which in one example is a hand held device that is movable between different tires of a vehicle and between different vehicles) transmits a signal 618 to the apparatus 600. In one example, the signal 618 is an LF signal with no affirmative, embedded, or transmitted data or information that would inform or instruct the apparatus to perform any function.

It will be appreciated that any transmitter that produces the signal 618 may replace the tool 616. In these regards, a fixed transmitter (of any type) may be substituted for the portable tool 616.

The receiver 601 is any type of receiver that can receive a wide variety of signals. The determine template and resolution determination module 602 receives the signal 618. Based upon a transmission characteristic (e.g., frequency, modulation type) of the signal 618. For example, the resolution determination and protocol determination may be made by the type of modulation such as CW, PWM, FSK, ASK, PSK, raised cosine or any suitable type of modulation. According to one aspect, the resolution may be determined based on received data. For example, as shown in FIG. 4 the pressure data received 408 is within manufacturer B's resolution range. Since data 408, such as pressure does not overlap with manufacturer C or A's ranges, then the sensor may infer that the sensor is transmitting according to manufacturer B. According to another aspect, the resolution determination is not based upon any data (e.g., identification information) if any in the signal, a determination can be made by the determine template and resolution determination module 602 that the signal 618 relates to a protocol or set of protocols that in turn may be associated with one or more manufacturers, group of manufacturers, model of vehicle, vehicle platform(s), or some other vehicle category. For example, modulation such as ASK, FSK, pulse width modulation and other physical signal characteristics may be used to identify a manufacturer or a group of manufacturers. In other words, while transmission characteristics of the signal 618 identify a particular protocol (or set of different protocols) such identification is not made by information within or carried by the signal 618 or analyzing information within or carried by the signal 618.

As mentioned, the each template relates to, is defined by, and/or is constructed according to a protocol or a set of protocols. By "protocol" and as used herein it is meant rules that describe how to effectuate the transfer of data between devices. The protocol may include data formats, modulation schemes, or transmission frequencies to mention a few examples. Each manufacturer may have a unique protocol or common protocols may be used between different manufacturers. Thus, a protocol or set of protocols may be associated with one or more manufacturers.

As mentioned, one type of information that can be determined is modulation type and the modulation type relates to a particular manufacturer or vehicle type. Some examples of modulation or transmission types include continuous wave (CW) transmissions, continuous wave data (CWdata) pulse width modulation, continuous wave amplitude shift keying (CW_ASK) modulation, continuous wave frequency shift keying (CW_FSK) modulation. Other examples are possible. In one aspect, the determine template and resolution determination module 602, determines the modulation type. This can be performed by a combinations of software and hardware actions. For example, if a CW_FSK signal is transmitted and the receiver is looking for a CW_ASK signal, the output of the receiver would be a high level for the duration of the transmitted signal. Such a signature would indicate that a CW_ASK signal is being transmitted. Additionally, RF receivers may output both ASK and FSK data on two distinct pins. The modulation type would then be known based on the pin that the data was output on.

The determine template and resolution determination module 602 is configured to, once the transmission parameter is identified, map this to a predetermined transmission template 606 or 608. The modulation type is also mapped to a particular resolution by a similar mapping. In one example, mapping or look-up tables may be used for these operations. Other approaches may also be used. As mentioned, the templates may be associated with one or more protocols.

The sensor 612 is any measurement device that measures the pressure or other information (e.g., temperature) of the tire 614. The transmitter 610 is any transmission device that transmits information. The memory 604 is any type of memory device.

As mentioned and in one aspect, the templates 606 and 608 specify one or more data formats, modulation types, transmission frequencies, or any other formatting or transmission protocol specified by a manufacturer, group of manufactures, or relating to a specific vehicle model, or type. For example, template 608 may relate to a template for a first manufacturer and template 610 may relate to a second and different manufacturer. The templates 606 and 608 may be stored in memory 604 at the time of manufacturing or may be changed on the fly during operation of the vehicle.

To take one example, one template 606 or 608 may include a burst of information that is defined by two or more protocols. For example, the template 606 or 608 may include frames of information to be transmitted according to a first protocol associated with a first automobile manufacturer and other frames transmitted according to a second protocol associated with a second automobile manufacturer. The other template 606 or 608 may also include a burst of information that is defined by two or more protocols. For example, the other template 606 or 608 may include frames of information to be transmitted according to a third protocol associated with a third automobile manufacturer and other frames transmitted according to a fourth protocol associated with a fourth automobile manufacturer.

In one example of the operation of the apparatus of FIG. 6, a signal 618 (an LF signal is received from portable, hand-held tool 616. The signal 618 is received at receiver 601. The determine template and resolution determination module 602 determines a transmission characteristic of the signal 618. This may, in some examples, be the frequency of the signal 618 or the type of modulation of the signal 618. Once the transmission parameter or parameters is or are determined, this is mapped to a template 606 or 608 and a resolution that are associated with the transmission parameter. For example, a look-up table can be used to map the determined transmission characteristic to a predetermined template and a predetermined resolution.

The template may be either template 606 or template 608 and these may be selected by the select signal 621 that is generated by the determine template and resolution determination module 602 once the template has been determined. The determine template and resolution determination module 602 also generates a resolution signal 623 with the resolution for the data to be used with the selected template 606.

The sensor 614 measures pressure data 622 (and/or other types of data) from the tire 614. In this example, template 606 is selected by select signal 621. The resolution of the data as indicated by signal 623 is used in a transmission 625 that is made by the transmitter 610.

In one aspect, the data transmission 625 corresponds to a customizable burst that includes a plurality of frames, and at least some of the frames (and in some examples each of the frames) includes tire pressure monitoring information and portions of the burst can be utilized by multiple types of receivers. For instance, each template 606 or 608 corresponds to a customizable burst that includes a plurality of frames, and at least some of the frames include tire pressure monitoring information and portions of the burst can be utilized by multiple types of receivers. The burst may be customized as to the needs of the user or the system.

It will be appreciated that the elements described with respect to FIG. 6 may be implemented in any combination or hardware and/or software elements. For example, the determine template and resolution determination module 602 may be implemented at a microprocessor that executes programmed computer instructions that implement the functions that have been described above.

Figure 7:
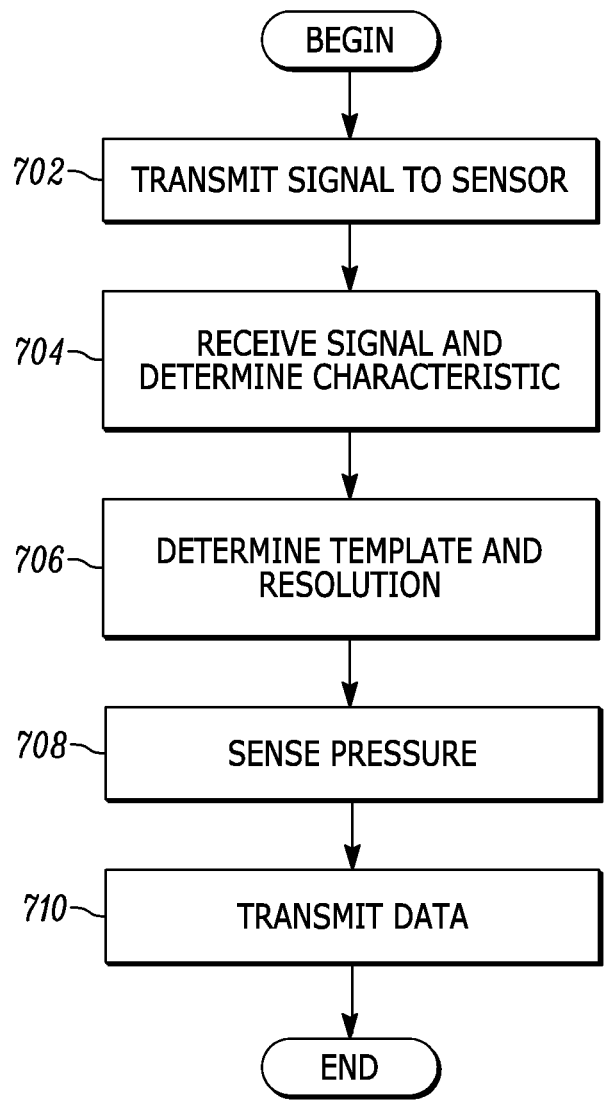
FIG. 7 comprises a flow chart of an approach for making TPMS transmissions according to various embodiments of the present invention.

Referring now to FIG. 7, one example of an approach for transmitting data from a tire pressure monitoring (TPM) sensor or monitor is described.

At step 702, a signal is transmitted from a transmitter to the TPM sensor. The signal has certain transmission characteristics (e.g., modulation type, frequency). The signal may be transmitted from a portable tool or a fixed transmitter.

At step 704, the signal is received at the TPM sensor and the transmission characteristic determined. Although the signal may in some aspects include or carry data, this data may or may not be utilized by the TPM sensor. Instead, at 706 and after the transmission characteristic has been determined, a predetermined template and data resolution associated with the transmission characteristic are determined. The transmission characteristic may be a modulation type, frequency, or some other characteristic. The template may be associated with a protocols or set of protocols. According to one embodiment, the resolution is determined by receiving an LF signal via an LF receiver that is already included in the TPMS monitor to facilitate the learn operation of those relevant OEM protocols. Thus, no HF receiver, nor a scan tool for configuration is required because the TPMS monitor is self-configuring based on the resolution determination.

At step 708, pressure (or other information such as temperature) from a tire is sensed. At step 710, the TPM sensor transmits this information using the selected template with the data transmitted according to the selected resolution. The transmission may be made to a receiver in the vehicle. As mentioned above, the TPMS wheel unit may be capable of transmitting families of protocols where the family of a particular protocol is determined by the above resolution determination. Thus, the actual data format and actual protocols transmitted is just a family of protocols rather than all N families of protocols. Thus, the TPMS wheel unit does not need to transmit all protocols or more than one family of protocols.

Figure 8:
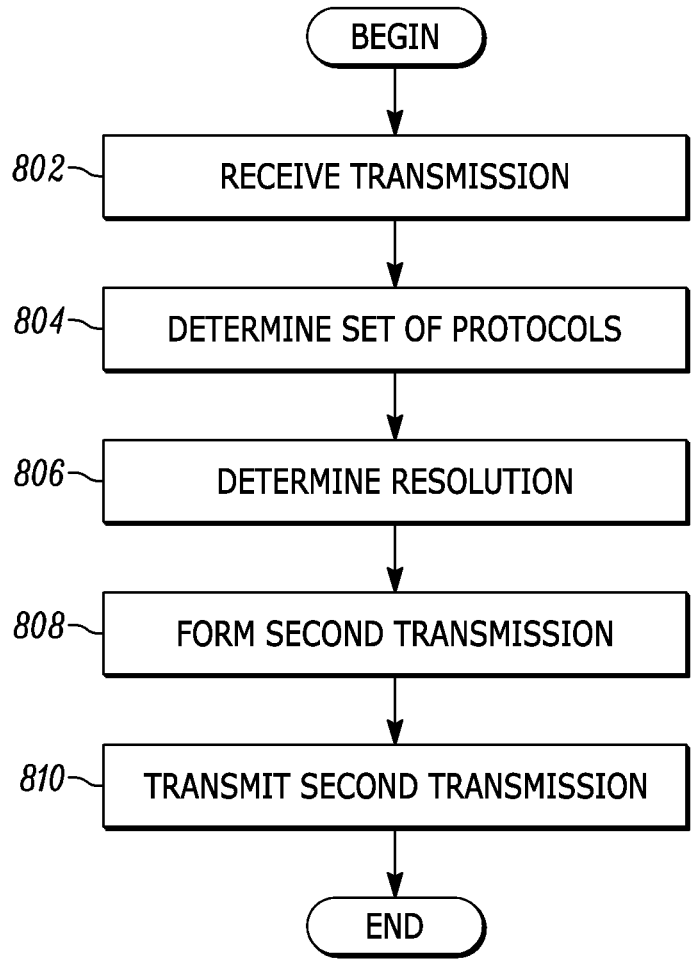
FIG. 8 comprises a flow chart of an approach for making TPMS transmissions according to various embodiments of the present invention.

Referring now to FIG. 8, another example of an approach for transmitting data from a tire pressure monitoring sensor is described. At step 802, a first signal transmission from a transmitter external to the monitor is received. In one example, first signal is a low frequency (LF) signal modulated by a CW, CWdata, CW_ASK, CW_FSK modulation approach. In the alternative or in addition, the first signal may be a high frequency signal (HF). For example, the HF signal may be 434 MHz, 315 MHz according to common OEM TPMS requirements, or any other suitable frequency. LF, thus would be lower in frequency than HF, such as 30 Hz, 60 Hz, 90 HZ, 125 KHz to 100's of KHz up to 315 MHz to 434 MHz or any suitable frequency. According to one embodiment, the LF signal is a LF low frequency trigger (wake) signal, typically a 125 KHz radio wave, with modulation (containing data) or without, transmitted by a TPMS scan tool or a vehicle transmitter to cause a TPMS sensor RF transmission. Other examples are possible.

At step 804 and in response to the first signal transmission, a determination is made as to whether the first signal corresponds to a corresponding set of protocols out of two or more sets of protocol.

At step 806, a data resolution is determined. At step 808, a second data transmission is formed according to the corresponding set of protocols and the sensed data is inserted into the transmission according to the resolution.

At step 810, the second data transmission is transmitted. In one example, the second data transmission corresponds to a customizable burst that includes a plurality of frames, and each of the frames includes tire pressure monitoring information and wherein portions of the burst can be utilized by multiple types of receivers. In other aspects, a TPMS identifier is included in the second data transmission. In still other examples, a FCC identifier is included in the second transmission. In some examples, the second data is transmitted by a transmitter in the TPMS monitor. In other examples, the monitor configures itself without the use of a scan tool.

Figure 9:
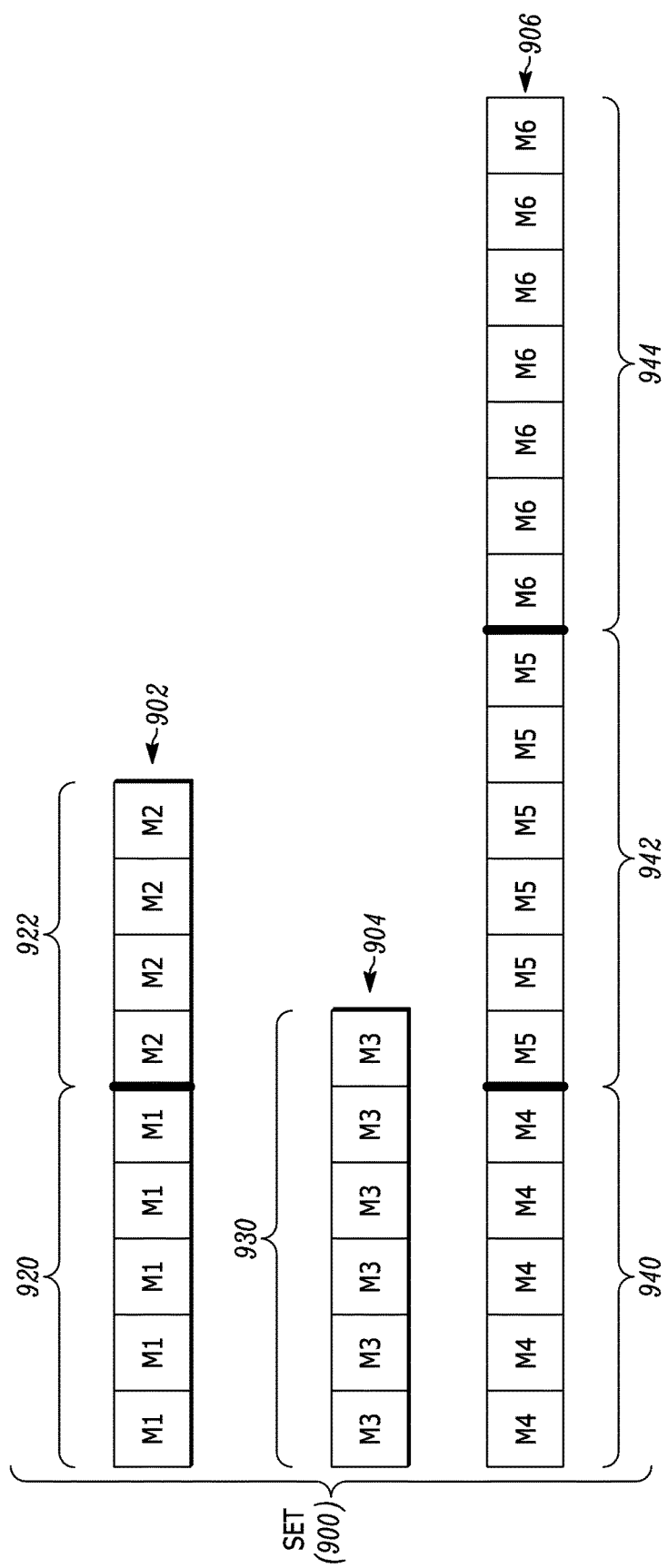
FIG. 9 comprises a diagram of one example of a set of transmissions that can be made from the TPM sensors described herein according to various embodiments of the present invention.

Referring now to FIG. 9, one example of a transmission made from the TPM sensor (e.g., sensors 300, 500, or 600). A set 900 of multiprotocol burst sequences includes a first multiprotocol burst sequence 902, a second multiprotocol burst sequence 904, and a third multiprotocol burst sequence 906. Each of the multiprotocol burst sequences includes frames that are transmitted according to a protocol. The protocol may be a manufacturer's protocol or may be compliant (e.g., not exactly match but be compatible with) a particular manufacturer's protocol, or may be a combination of manufacturer's protocols or manufacturer-compliant protocols.

The first multiprotocol burst sequence 902 includes frames 920 compliant or following a first manufacturer protocol (M1) and frames 922 compliant or following a second manufacturer protocol (M2). The second multiprotocol burst sequence 904 includes frames 930 compliant or following a third manufacturer protocol (M3) only. The third multiprotocol burst sequence 906 includes frames 940 compliant or following a fourth manufacturer protocol (M4), frames 942 compliant or following a fifth manufacturer protocol (M5), and frames compliant or following a sixth manufacturer protocol (M6). It will be appreciated that this is one example and that other examples are possible. It will also be appreciated that in the example of FIG. 6, the transmitted made from the transmitter is selected from the set 900. In other words, the selected template relates or is one of the multiprotocol burst sequences selected from the set 900 and this selection is based a characteristic of the transmission received at the apparatus 600 (e.g., a tire pressure monitoring sensor). Additionally, the frames complaint with different manufacturer's protocols may be interleaved. For example they may be interleaved as shown and in U.S. Pat. No. 8,576,060, which is incorporated by reference herein in its entirety.

It should be understood that any of the devices described herein (e.g., the programming or activation devices, the wheel units, the controllers, the receivers, the transmitters, the sensors, the presentation devices, or the external devices) may use a computing device to implement various functionality and operation of these devices. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

In many of these embodiments, a method of transmitting data from a tire pressure monitoring system (TPMS) monitor includes: receiving a first signal transmission from a transmitter external to the monitor, the first signal having a transmission characteristic; based upon the transmission characteristic of the first signal transmission, determining a corresponding at least one protocol; determining a data resolution based upon the transmission characteristic; forming a second data transmission according to the corresponding at least one protocol, and inserting sensed data into the second data transmission according to the resolution; and transmitting the second data transmission.

In some aspects, the corresponding at least one protocol is a set of protocols selected from two or more sets of protocols. In other aspects, the transmission characteristic comprises a modulation type or frequency.

In some examples, the second data transmission corresponds to a customizable burst that includes a plurality of frames, and each of the frames includes sensed tire pressure monitoring information and wherein portions of the burst can be utilized by multiple types of receivers. In other examples, the first signal is a low frequency signal modulated by continuous wave (CW) modulation, continuous wave data (CW data) modulation, continuous wave amplitude shift keying (CW_ASK) modulation, or continuous wave frequency shift keying (CW_FSK) modulation.

In still other aspects, a TPMS identifier is included in the second data transmission. In some examples, the TPMS identifier comprises a FCC identifier. In other aspects, the monitor configures itself without the use of a scan tool.

In others of these embodiments, a computer usable non-transitory medium has a computer readable program code embodied therein, said computer readable program code adapted to be executed to implement a method of transmitting data from a tire pressure monitoring system (TPMS) monitor, and the method includes: receiving a first signal transmission from a transmitter external to the monitor, the first signal having a transmission characteristic; based upon the transmission characteristic of the first signal transmission, determining a corresponding at least one protocol; determining a data resolution based upon the transmission characteristic; forming a second data transmission according to the corresponding at least one protocol, and inserting sensed data into the second data transmission according to the resolution; and transmitting the second data transmission.

In some aspects, the corresponding at least one protocol is a set of protocols selected from two or more sets of protocols. In other aspects, the transmission characteristic comprises a modulation type or frequency.

In some examples, the second data transmission corresponds to a customizable burst that includes a plurality of frames, and each of the frames includes sensed tire pressure monitoring information and wherein portions of the burst can be utilized by multiple types of receivers. In other examples, the first signal is a low frequency signal modulated by continuous wave (CW) modulation, continuous wave data (CW data) modulation, continuous wave amplitude shift keying (CW_ASK) modulation, or continuous wave frequency shift keying (CW_FSK) modulation.

In still other aspects, a TPMS identifier is included in the second data transmission. In some examples, the TPMS identifier comprises a FCC identifier. In other aspects, the monitor configures itself without the use of a scan tool.

In others of these embodiments, an apparatus includes: a receiver with an input, the receiver configured to receive a first signal transmission from a transmitter external to the apparatus at the input, the first signal having a transmission characteristic; a determine template and resolution determination module coupled to the receiver, the determine template and resolution determination module configured to based upon the transmission characteristic of the first signal transmission, determine a corresponding at least one protocol, the determine template and data resolution module further configured to determine a data resolution based upon the transmission characteristic, form a second data transmission according to the at least one corresponding protocol, and insert sensed data into the second data transmission according to the resolution; and a transmitter with an output and coupled to the determine template and resolution determination module, the transmitter configured to transmit the second data transmission at the output.

In some aspects, the corresponding at least one protocol is a set of protocols selected from two or more sets of protocols. In other aspects, the transmission characteristic comprises a modulation type or frequency.

In other examples, the second data transmission corresponds to a customizable burst that includes a plurality of frames, and each of the frames includes sensed tire pressure monitoring information and wherein portions of the burst can be utilized by multiple types of receivers. In other examples, a first signal is a low frequency signal modulated by continuous wave (CW) modulation, continuous wave data (CW data) modulation, continuous wave amplitude shift keying (CW_ASK) modulation, or continuous wave frequency shift keying (CW_FSK) modulation.

In some aspects, a TPMS identifier is included in the second data transmission. In some examples, the TPMS identifier comprises a FCC identifier. In other examples, the apparatus configures itself without the use of a scan tool.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method of transmitting data from a tire pressure monitoring system (TPMS) monitor, comprising:
   receiving a first signal transmission from a transmitter external to the monitor, the first signal having a transmission characteristic;
   based upon the transmission characteristic of the first signal transmission, determining a corresponding at least one protocol;
   determining a data resolution based upon the transmission characteristic;
   forming a second data transmission according to the corresponding at least one protocol, and inserting sensed data into the second data transmission according to the resolution; and
   transmitting the second data transmission, wherein the second data transmission corresponds to a customizable burst that includes a plurality of frames, and each of the frames includes sensed tire pressure monitoring information and wherein portions of the burst are compatible with multiple types of receivers.

2. A computer usable non-transitory medium having a computer readable program code embodied therein, said computer readable program code adapted to be executed to implement a method of transmitting data from a tire pressure monitoring system (TPMS) monitor, the method comprising:
- receiving a first signal transmission from a transmitter external to the monitor, the first signal having a transmission characteristic;
- based upon the transmission characteristic of the first signal transmission, determining a corresponding at least one protocol;
- determining a date resolution based upon the transmission characteristic;
- forming a second data transmission according to the corresponding at least one protocol, and inserting sensed data into the second data transmission according to the resolution; and
- transmitting the second data transmission, wherein the second data transmission corresponds to a customizable burst that includes a plurality of frames, and each of the frames includes sensed tire pressure monitoring information and wherein portions of the burst are compatible with multiple types of receivers.

3. An apparatus, comprising:
- a receiver with an input, the receiver configured to receive a first signal transmission from a transmitter external to the apparatus at the input, the first signal having a transmission characteristic;
- a determine template and resolution determination module coupled to the receiver, the determine template and resolution determination module configured to based upon the transmission characteristic of the first signal transmission, determine a corresponding at least one protocol, the determine template and data resolution module further configured to determine a data resolution based upon the transmission characteristic, form a second data transmission according to the at least one corresponding protocol, and insert sensed date into the second data transmission according to the resolution; and
- a transmitter with an output and coupled to the determine template and resolution determination module, the transmitter configured to transmit the second data transmission at the output, wherein the second data transmission corresponds to a customizable burst that includes a plurality of frames, and each of the frames includes sensed tire pressure monitoring information and wherein portions of the burst are compatible with multiple types of receivers.

* * * * *